Oct. 17, 1933.   W. H. NOELTING   1,930,622
DOUBLE BALL LOCK CASTER
Filed July 13, 1931
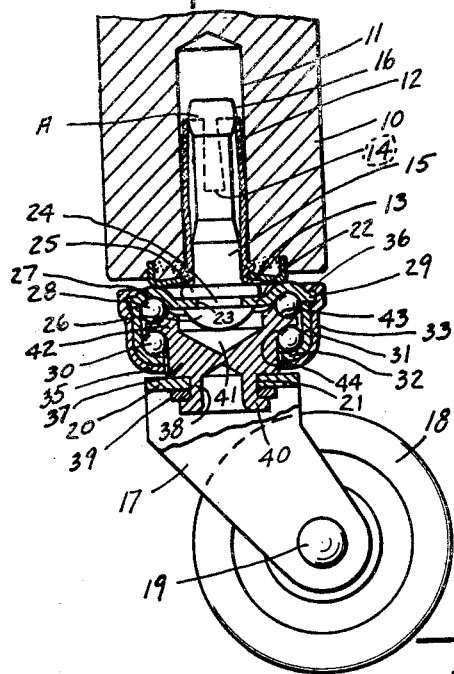
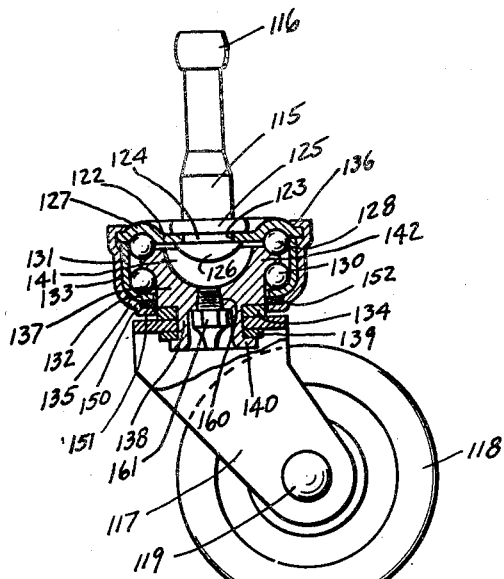
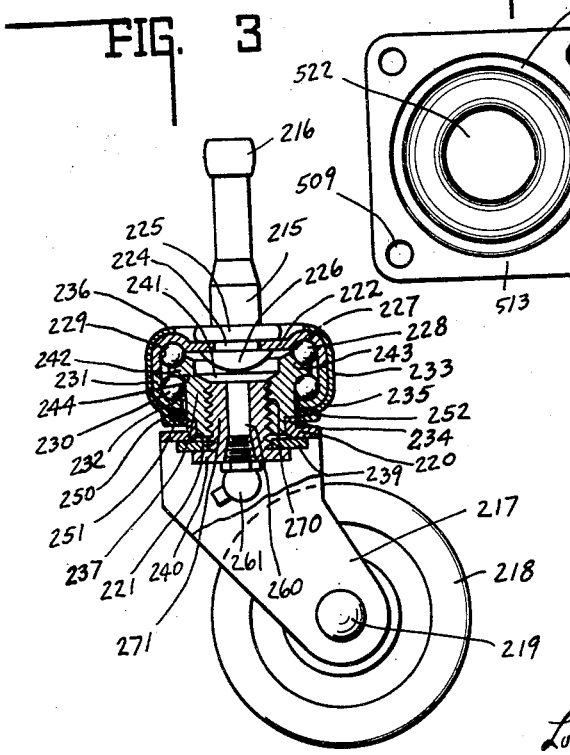
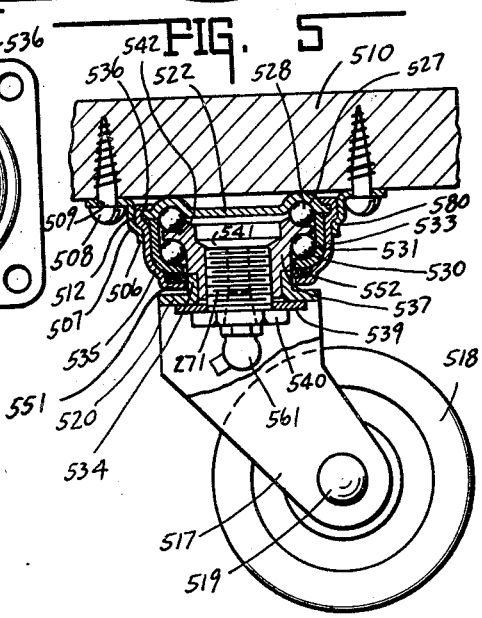
INVENTOR.
WILLIAM H. NOELTING.
BY
Lockwood Lockwood Goldsmith & Galt
ATTORNEYS.

Patented Oct. 17, 1933

1,930,622

UNITED STATES PATENT OFFICE 1,930,622

DOUBLE BALL LOCK CASTER

William H. Noelting, Evansville, Ind., assignor to Faultless Caster Company, Evansville, Ind., a corporation Application July 13, 1931. Serial No. 550,414

1 Claim. (Cl. 16—21)

This invention relates to a swivelling caster construction.

One object of the invention is to replace standard casters with the improved caster of the present construction in a predetermined association so that there results a non-rotative, readily detachable caster mounting.

Another, and the main object of the invention, is to provide a caster construction which is arranged so that the load is coaxially transmitted to a yoke supported member and said member is swivally mounted for free swivelling and which is laterally constrained by an anti-friction arrangement for lateral thrust purposes and which yoke supported member is locked to the anchoring member of the caster construction solely through the anti-friction construction.

In addition to the accomplishment of the foregoing objects, one feature of the invention consists in the detachable connection of the swivelling member and the yoke supporting the same.

Another feature of the invention consists in the provision of means for supplying to and retaining in the caster construction, lubricant for lubricating purposes.

The full nature of the invention will be understood from the accompanying drawing and the following description and claim:—

In the drawing, Fig. 1 is a central sectional view through the caster construction embodying the invention, the wheel and a portion of the yoke being shown in elevation and operatively associated with the load supporting leg and as a replacement caster.

Fig. 2 is a similar view of a modified form of caster construction shown in Fig. 1.

Fig. 3 is a similar view of a still further modified form of caster construction.

Fig. 4 is a top plan view of the plate caster construction shown in Fig. 5.

Fig. 5 is a view similar to Fig. 1 and of a plate caster construction.

In Fig. 1 of the drawing, 10 indicates a load supporting leg having a longitudinal opening 11 therein, and associated therewith is a standard caster socket having the longitudinally directed and inwardly directed spring arms 12 carried by the anchoring plate 13 secured to the bottom of the leg.

As indicated by the dotted lines 14 in Fig. 1, the normal position of the socket spring portions is inwardly directed.

To secure greater freedom of swivelling, the present invention is adapted to replace the previous caster structure and in the present invention, the stem 15 includes a head portion 16 which is positioned below the usual level of the head portion of the replaced stem so that the spring portions 12 of the socket bear upon the head portion and preferably immediately beneath the horizontal median plane thereof, so that, not only does the original spring frame socket serve as a stem retainer for detachably retaining the stem in the socket, as heretofore, but now also serves to frictionally hold the stem 15 against casual rotation. The original caster, it is to be understood, included a stem rigid with the yoke and the swivelling between the yoke and the leg took place by the swivelling of the stem in the socket, whereas, with the present invention, the swivelling of the yoke takes place between the yoke and the stem.

When this type of swivel operation is desired, there is introduced into the caster construction a problem which requires that there be incorporated in the new caster construction provision for preventing lateral cocking of the yoke relative to the stem while it is under load by reason of the offsetting of the wheel axis with reference to the stem axis or swiveling axis.

Also to insure substantially frictionless swiveling, which is one of the prime purposes for replacing the old caster construction by the present one, there must be provided an anti-friction load sustaining connection between the yoke and the stem or load supporting member.

The caster includes the usual yoke having the depending ears 17 which rotatably mount therebetween the wheel 18 upon the axle 19 and said ears are connected by the horizontal yoke portion 20 suitably apertured as at 21.

The swivel connection between the stem or load anchoring member and the yoke includes a top plate 22 having a central opening 23 in which is mounted portion 24 of the stem, said stem including the upper enlargement 25 and the lower enlargement 26, whereby the top plate is rigidly secured to the stem or load anchoring member 15. Coaxial with the opening 23 is an upwardly directed, arcuately sectioned annular portion 27 which is adapted to engage upon its under face an upper annular series of balls 28. The plate terminates in an outwardly projecting peripheral flange 29. A second and lower series of balls 30 are provided and as shown in Fig. 1, a ball retainer of cylindrical form 31 includes an inturned portion 32 that underlies the lower balls. A sleeve 33 includes, at its lower end, the inturned portion 35 which serves to retain the retainer and the top plate in rigid connection, the top plate bearing upon the top of the retainer. The sleeve, as indicated at 36, is directed inwardly and overlies the peripheral flange of the top plate. The top plate and retainer together form an enclosed chamber with a restricted opening or throat in its lower end.

A swiveling member 37 includes a reduced portion 38 that is mounted in the central opening 21 of the yoke and beneath the yoke is mounted the washer 39 and the extended end of the reduced portion 38 is laterally enlarged as at 40 for rigidly securing the swiveling member to the yoke. This swiveling member is coaxially recessed in its upper face as at 41 to nestingly clear the stem enlargement 26. The swiveling member in spaced relation to the yoke, includes a peripheral lateral enlargement 42, the upper surface 43 of which is engaged by the upper series of balls and the lower surface 44 of which is engaged by the lower series of balls.

The aforesaid construction insures that the load transmitted from the top plate through the upper series of balls is imparted to the swiveling member by the upper series of balls and cocking of the swiveling member in the chamber by reason of the eccentricity of the axis of axle 19 with reference to the swiveling axis, is substantially eliminated by the balls 30, which are provided for thrust purposes. Likewise, the balls 30 constitute the lock and the sole means whereby the swiveling member is permanently secured to the top plate.

In Fig. 2 there is illustrated a modified form of the invention, wherein the caster is arranged for lubrication. In this figure, numerals of the one-hundred series indicate like parts, to wit; 115 indicates the stem; 116 indicates the head thereof; 124 indicates the yoke receivable portion thereof; 125 indicates the upper flange; 126 indicates the lower enlargement whereby the stem is rigidly secured to the top plate 122 which is also provided; 127 indicates an annular race way, which bears upon the upper series of balls 128 and the top plate bears upon the upper edge of the retainer 131 having the lower inturned portion 132 and rigidly secured to the top plate through the sleeve 133 by the lower inturned portion 135 and the upper inturned portion 136. The sleeve 132 is coaxially offset as at 150, and terminates in an inwardly directed annular flange 151 forming a peripherally arranged annular chamber with the retainer which receives a sealing member 152 that bears upon the swiveling construction including the member 137 which includes the reduced portion 138 laterally enlarged as at 140 to bear upon a washer 139 beneath the yoke.

In the present form of the invention, another washer 134 is interposed between the upper face of the yoke and the swiveling member. The lower series of balls is indicated by the numeral 130, the wheel by the numeral 118, the yoke ears by the numeral 117, and the wheel axle by the numeral 119. The swiveling member 137 is provided with a threaded opening 160 that provides access to the central recess 141 and said threaded opening mounts a pressure operable, lubricant closure fixture 161. Lubricant is supplied under pressure through fixture 161 and is retained in the central recess 141 of the swiveling member and the excess is discharged between the upper series of balls 128 and thence downwardly to the lower series of balls and is prevented from escaping therebetween and dropping on to the yoke by the retainer or sealing member 152. The lubricant is retained by the closure 161.

In Fig. 3 a modified form of the invention is illustrated, wherein the swiveling member and the yoke are not permanently connected together although the swiveling member is permanently locked to the top plate only through the balls. In this form of the invention, similar parts are indicated by numerals of the two-hundred series. 216 indicates the head of the stem 215 suitably anchored by the portions 226, 224 and 225 to the top plate 222 having the race forming portion 227 which bears upon the upper series of balls 228. The flange 229 in the present form of the invention, instead of being only outwardly directed, is downwardly directed and bears upon the upper end of the lower ball retainer 231 having the lower inturned ball retaining portion 232. A shell or sleeve 233 includes an inturned lower retainer retaining portion 235 and an upper inturned plate engaging portion 236.

The lower inturned portion 235 includes a coaxially arranged depending portion 250 terminating in an inwardly directed peripheral flange 251 forming a groove receiving the annular sealing member 252 which bears upon the swiveling member 237. The swiveling member 237 is recessed as at 241 to nest and clear stem enlargement 226. The lower series of balls is indicated by the numeral 230 and bear upon the under face of the lateral enlargement 244 of the swiveling member. The upper series of balls 228 bear upon the upper face 243 thereof. The lower series of balls constitutes the lower and sole lock between the plate and the swiveling member, the plate and retainer being secured together by the sleeve 233.

In this form of the invention, the intermediate swiveling member is centrally apertured as at 270 and the yoke 220 is also centrally apertured as at 221 and the yoke aperture is peripherally defined by the upwardly directed collar 234 which bears upon a lower shoulder face of the swiveling member. A suitable washer 239 is positioned beneath the yoke and the head portion 240 of a stud 271, the same being threaded into the opening 270 whereby the yoke is rigidly and detachably secured to the swiveling member 237 and the aforesaid construction permits a so-called unit assembly and subsequent attachment of the yoke to the assembly. This form of invention likewise includes an aperture or supply passage 260 which has a portion threaded to receive the pressure operable lubricant closure fixture 261. Lubricant supplied thereto follows the path in substantially the same manner as previously described for the modification represented in Fig. 2 and is retained in the caster construction by the sealing member 252. If desired, this lubrication feature may be omitted, in which event the portions 250 and 251 as well as the sealing member 252 are omitted and the sleeve 233 is formed at this lower portion, as indicated at 35 in Fig. 1. Also, in this modification, the stud instead of being apertured as at 260 would be a solid stud.

In Figs. 4 and 5, a modified form of the invention is illustrated and the same is directed to the plate caster type. In said figures, 510 indicates the load supporting member and there is provided a plate 513 of any suitable outline, apertured at 509 to receive screws or equivalent load anchoring members 508. The plate includes a central circular depressed portion 512 which terminates in an inwardly directed flange 507 in turn terminating in a coaxial downwardly directed tubular portion 506. The top plate 522 and ball retainer 531 may be secured together by the sleeve 533 having an inturned upper portion 536 and an inturned lower portion 535, the same being of substantially the same form as illustrated in Fig. 1. The lateral enlargement of said sleeve forms a lower shoulder 580 that is arranged to seat upon the inturned portion 507 of the plate which in this form of the invention constitutes the anchoring member. The sleeve 533 is press fitted into the plate aperture and rigidly secured thereto by said press fitting operation.

This form of the invention also is illustrated as embodying, if and when desired, the lubrication feature and when this is employed there is provided the sealing member 552 and supply fixture 561.

Likewise, this form of the invention may, if desired, embody the detachable connection of the yoke to the swiveling member and in this event, there is provided the stud 271. If detachable connection is not desired, the yoke may be permanently connected to the swiveling member, as indicated in Fig. 2, should it be desirable to employ the lubrication feature. Should it be desirable to omit the lubrication feature and employ only the detachable connection between the yoke and the swiveling member, the stud 271 will not be apertured and will not be provided with the pressure operable lubricant closure feature 561. All the parts in this form of the invention bear numerals of the five-hundred series.

The invention claimed is:

In a double ball caster of the ball locking type having a yoke and a load anchoring member, the combination of a pair of series of locking balls, the upper series primarily for load and the lower series for lateral thrust, a top plate having an upwardly arched annular groove for upper ball operative engagement and confinement, a centrally apertured cup having a lower inner inturned portion for lower ball engagement for laterally confining and supporting the lower balls, the upper end of the cup having an abuttable contact with the top plate, a sheet metal shell clampingly associating the cup and plate together and peripherally encircling the same, and a single, one piece internal central member rigid with the yoke and extending upwardly through the aperture in the cup and terminating near its upper end in a lateral enlargement terminating considerably short of cup inner wall engagement, said central member enlargement having an upwardly and outwardly directed, arcuately sectioned in cross section, ball seat for engagement by the lower portions of the upper balls and confining said balls against inward movement, said central member enlargement having an outwardly and downwardly directed similarly sectioned ball seat for engagement by the upper portions of the lower balls and confining said balls against inward movement, the outer peripheral surface of the enlargement being of a diameter not greater than the outer diameter of the effective peripheral contact of the largest diameter of the series of balls.

WILLIAM H. NOELTING.